Nov. 12, 1935.  G. E. SMITH  2,020,438
AUTOMOBILE SEAT
Filed Dec. 28, 1933
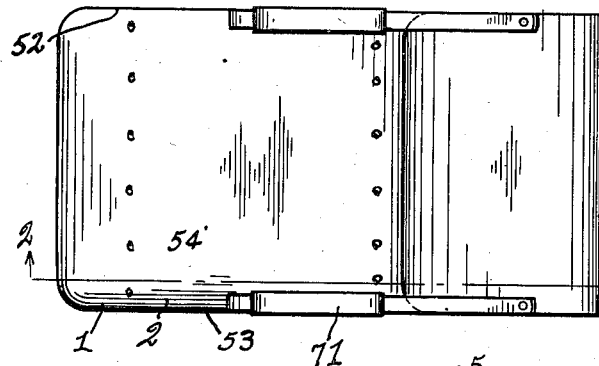
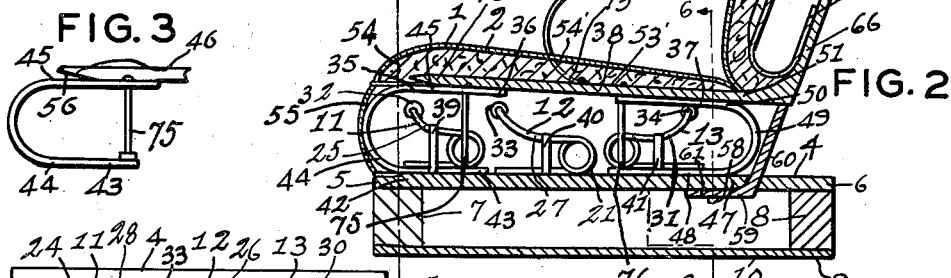
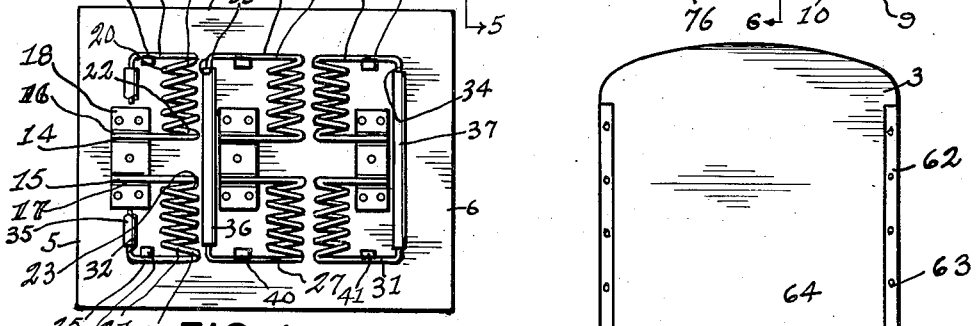
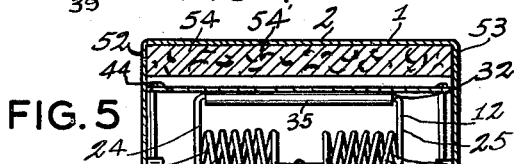
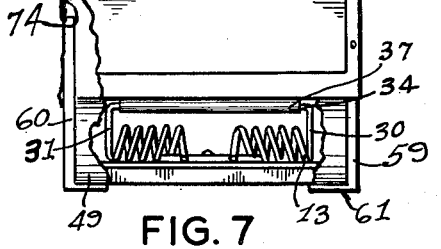
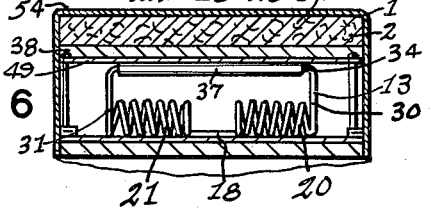
INVENTOR.
GEORGE E. SMITH
BY
Leo N. Parker
ATTORNEY.

Patented Nov. 12, 1935

2,020,438

UNITED STATES PATENT OFFICE 2,020,438

AUTOMOBILE SEAT

George E. Smith, Cincinnati, Ohio

Application December 28, 1933, Serial No. 704,313

4 Claims. (Cl. 155—179)

The invention relates to a seat particularly, although not exclusively, adapted for use in automobiles.

It is well known that automobiles, particularly passenger automobiles, travel rapidly over the highways with the result that a considerable vertical shock is produced by a comparatively small elevation or depression in the roadway. This is true, although the modern automobiles are equipped with pneumatic tires and shock absorbers, since the vibrations and shocks of the vehicle are not completely absorbed by the chassis spring construction of the vehicle in combination with the tires and shock absorbers.

It is, therefore, advisable and necessary, in order to insure comfort to the occupants of motor vehicles, that a seat construction be provided which is adapted to absorb a great majority of shocks and vibrations imparted to said seat as a result of inefficient operation of the chassis spring construction, in combination with the shock absorbers of the vehicle. In certain respects these facts apply to other kinds of vehicles, such as steam and electric railway passenger coaches, motor coaches, and the like.

Therefore, an important object of the invention is to provide a seat structure which is compact, strong, simple and particularly adapted to absorb vibrations and shocks, irrespective of the weight of a person who may be supported by said seat.

Other objects of the invention are to provide an improved resilient or cushion seat particularly adapted for utilization in motor vehicles utilizing pneumatic tires, chassis spring construction, and shock absorbers, said improved seat being adapted to absorb shocks and vibrations which said pneumatic tires, chassis spring construction, and shock absorbers fail to absorb; to provide a motor vehicle seat adapted to effectively absorb shocks incidental to the travel of the vehicle over the roadway and which will afford maximum comfort to its occupants, irrespective of the weight of said occupants, the unevenness of the roadway and the rate of speed at which said vehicle travels; to provide a spring seat construction which is unlikely to require frequent replacement of parts and repairs; and to provide a spring seat construction unlikely to produce noise, squeaks, rattles and other undesirable noises, while said vehicle is traveling over the highways.

The invention consists in the combination of the elements, arrangement of the parts and in the details of the construction, as hereinafter fully explained.

In the drawing:

Fig. 1 is a plan view of a seat, having the invention incorporated therein;

Fig. 2 is a section taken on a line corresponding to 2—2 in Fig. 1;

Fig. 3 is a side elevational view of the front spring sheet with parts removed and parts broken away;

Fig. 4 is a plan view of the support with springs thereon, and with parts broken away;

Fig. 5 is a section taken on a line corresponding to 5—5 in Fig. 2;

Fig. 6 is a section taken on a line corresponding to 6—6 in Fig. 2; and

Fig. 7 is a rear view of the seat, with parts broken away, having the invention incorporated therewith.

In the preferred construction of the invention I provide the seat I comprising the seat part 2 and the back rest 3. The seat part 2 comprises the horizontal rectangular inflexible support 4 having its front and rear ends 5 and 6 supported by the blocks 7 and 8 which are supported by the usual floor 9, of the motor vehicle 10.

In spaced apart relation and extending from the front to the rear of the support 4 are the coil spring units 11, 12 and 13 whose ends or arms 14 and 15 are fixed to the upper surface of the support 4 as by being received in the grooves 16 and 17 of the plates 18 fixed to the support 4 as by the bolts 19.

Each of the springs 11, 12 and 13 is composed of a steel rod bent to form two coils 20 and 21, in horizontal alignment with each other. The arms 14 and 15 extend from the inner ends 22 and 23 of the coils and in parallel relation with each other. The leaf arms 24 and 25, and 26 and 27 integrally formed with the other ends 28 and 29 of the coils 20 and 21 of the units 11 and 12 extend forwardly and upwardly, and the leaf arms 30 and 31 of the unit 13 extend rearwardly and upwardly.

Integrally formed with the upper ends of the arms 24, 25, 26, 27 and 30 and 31 are the cross bars or rods 32, 33 and 34 which extend at right angles with the connecting arms and have received therearound the rotatable and resilient tubes 35, 36 and 37 which may be formed from rubber or other sound absorbing material for the purpose of reducing noises when the rods 32, 33 and 34 contact the base 38 or other parts.

The normal tension in the coil springs 20 and 21 of each unit 11, 12 and 13 is such that when the arms 24, 25, 26, 27, 30 and 31 are positioned, as shown in Fig. 2, there is considerable tension in the springs whereby in order to retain the extended arms in the position shown in Fig. 2 it is necessary that the bands 39, 40 and 41 are received around the arms for the purpose of preventing upward movement thereof from their predetermined position.

Spaced and positioned vertically from the support 4 is the normally horizontal rectangular seat board 38 which is flexible. Fixed to the upper surface of the front end 42 of the support 4 is the lower end 43 of the front steel spring sheet 44 having its upper end 45 fixed to the lower surface of the front end 46 of the seat board 38, whereby the spring 44 is curved outwardly and forwardly. Fixed to the upper surface of the rear end 47 of the support 4 is the lower end 48 of the rear steel spring sheet 49 having its upper end 50 fixed to the lower surface of the rear end 51 of the seat board 38, whereby the spring 49 is curved outwardly and rearwardly. Each of the steel spring sheets 44 and 49 extends from the side 52 to the side 53 of the seat part 2 and the seat board 38, and when in normal use the springs 44 and 49 are curved outwardly as shown in Fig. 2, and support the seat board 38. The steel spring sheet 44 has greater depth or is higher than the steel spring sheet 49, whereby the seat board or support 38 is inclined downwardly and rearwardly, since the support 4 is horizontal and the upper and lower ends, respectively, of the springs 44 and 49 contact the seat board 38 and the support 4.

Suitably fixed to the upper surface 53' of the seat board 38 is cushioning material 54 having thereon the cover 54' whose side edges and the rear edge are secured to the side edges of the seat board 38. The front edge 55 of the cover 54' is received around and on the outside of the front spring sheet 44 and has its lower end suitably fixed to the upper surface of the front end of the support 4.

The lower front edge 46 of the seat board 38 is inclined or curved upwardly and outwardly whereby the space 56 is normally provided between the front edge of the seat board 38 and the upper surface of the curved and bent spring sheet 44. The pressure of the seat board 38, on the upper end of the spring sheet 44, is exerted at different points dependent upon the weight or downward force exerted on the front edge of the seat board which, as previously mentioned, is flexible and adapted to sag or bend downwardly when weight is placed thereon, whereby different lengths of the spring 44 are operative at different times which results in easy riding quality of the seat 1, as well as preventing cracking of the spring 44 since its bending point is varied depending on the weight of the person seated on the seat part 2.

Secured as by the screws 58 to the side edges of the support 4 are the angle plates 59 which are bent upwardly and the legs 60 thereof extend at about 100° with respect to the horizontal legs 61.

The angle plates 62 are secured as by the screws 63 to the side edges of the rear support 64 of the back rest 3. Secured to the upper and lower edges 65 and 66 of the forward surface of the support 64 are the rear ends of the spring steel sheets 67 and 68 and having their forward ends secured to the upper and lower edges of the inner surface of the vertical flexible board 69 having on its front surface padding which has thereon the cover 70 having its edges secured to the edges of the support 64. The arm rests 71 have their upper and lower ends 72 and 73 respectively secured to the legs 60 and 61 of the angle plates 59.

The front and rear springs 44 and 49 are curved outwardly and the seat board 38 is flexible, whereby when a person seats himself upon the seat part 2 the shocks and vibrations which are imparted upwardly through the floor 9 of the vehicle 10 are adapted to be absorbed by the spring movement of the steel springs 44 and 49.

The cross rod 34, of the rear spring unit 13, remains in contact at all times with the lower surface of the horizontal portions of the upper end of the rear spring sheet 49. When the seat part 2 is unoccupied the cross bar 33 of the intermediate spring unit 12 is spaced from the lower surface of the seat board 38, and under the same conditions the cross bar 32 of the front spring unit 11 is spaced a greater distance from the lower surface of the horizontal upper end of the spring 44 than the rod 33 is spaced from the seat board 38, whereby when a passenger of a predetermined weight seats himself upon the seat part 2 the flexible seat board 38 sags or bends downwardly a distance which may result in the cross bar 33 contacting the lower surface of the seat board 38 and still the cross bar 32 remains spaced from the spring sheet 44, and vibrations and jars of sufficient intensity are adapted at various times to cause the spring sheet 44 to contact the cross bar 32 thereby intermittently bringing the spring unit 11 into use with respect to the resilient movement of the seat board 38. Since the arms 24, 25, 26, 27, 30 and 31 of the units 11, 12 and 13 are forced and retained downwardly in a predetermined position, by the bands 39, 40 and 41, with respect to the upward movement of the cross rods of the spring units, sufficient resiliency is provided by the coil springs of the spring units 11, 12 and 13 to absorb shocks and vibrations which may be imparted upwardly by the floor 9, of the vehicle 10, and through the blocks 7 and 8 and the support 4. The horizontal legs 60 of the angle plates 59 are secured to the bottom of the rear edge of the support 4 and have their upwardly extending legs 60 received in the holes 74 of the plates 62 whereby the movement of the back rest 3 is regulated and side movement is reduced.

The tie rods 75 and 76 retain the springs 44 and 49 in tension.

An advantage of the invention is that the seat part 2 is adapted to support passengers of different weights and retains efficiency to absorb road shocks and vibrations, particularly for the reason that when a person, whose weight is relatively light, is seated upon the seat part 2 his weight is supported by the front and rear spring sheets 44 and 49 and the spring unit 13 without the spring units 11 and 12 being utilized, except when the vehicle is traveling and contacts an unusually severe shock which causes the support 4 to move upwardly thereby causing the cross rods 32 and 33 to contact the spring 44 and the lower surface of the seat board 38. When a person whose weight is relatively heavy seats himself upon the seat part 2 the seat board 38 is forced downwardly so that the cross bars 32 and 33 assist to support the heavy weight passenger and thus, irrespective of the weight of the passenger or occupant of the seat 1, the resiliency of the spring supporting elements comprising the front and rear spring sheets 44 and 49 and the spring units 11, 12 and 13, does not stiffen to such a degree that the resiliency is importantly impaired.

Still another advantage of the invention is that the cross bars 31, 32 and 33 of the spring units 11, 12 and 13 are provided with the rubber hose or tubes 35, 36 and 37, whereby contact of the cross bars with respect to the seat board and springs 44 and 49 does not produce undesirable noises.

Still another advantage of the invention is that since the rods 32, 33 and 34 of the spring units 11, 12 and 13 are retained in predetermined downward position, as by the bands 39, 40 and 41, the coil springs of each unit are retained in tension, and the spring units are unlikely to rattle or vibrate when operative or inoperative with respect to supporting and retarding the downward movement of the seat board 38.

Still another advantage of the invention is that the back rest 3 is connected with the seat board 38 and vertical movement of the seat board is imparted to the back rest, whereby the back rest is unlikely to rub the back of the occupant of the seat but moves in unison with the general movement of the seat part 2. Also, twisting movement of the seat board 38 with respect to movement of the support 4 is prevented, since the spring sheets 44 and 49 are attached to the front and rear edges of the seat board and support, whereby movement of the back rest 3 is restricted to upward, downward, forward and rearward movements.

Still another advantage of the invention is that since the front edge of the seat board 38 is inclined upwardly and outwardly the flexibility, with respect to the weight thereon, of the front spring sheet 44 is regulated for the purpose of increasing its efficiency in absorbing shocks and vibrations which may be imparted upwardly by the support 4.

While I believe that the form of the invention illustrated in the drawing and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims.

Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. A seat having a seat part comprising spaced apart flexible seat board and inflexible support, means to support said support on a floor, a pair of outwardly curved spring steel sheets respectively fixed to the front and rear edges of said seat board and said support, a spring unit mounted on said support and composed of a rod of spring metal bent to form two coils and having an upwardly extending leaf arm, a cross bar integrally formed with the ends of said leaf arm, means to retain said leaf arm of said spring unit in predetermined position and with tension in said coil springs, said cross bar being normally spaced from said seat board, and so positioned that when the weight of an occupant of said seat is sufficiently heavy said seat board is caused to contact said unit cross bar and when the weight of the occupant of said seat is sufficiently light said seat board remains normally spaced from said unit cross bar, whereby said curved spring sheets are depended upon to maintain said seat board in spaced apart relation to said support.

2. A seat having a seat part and a back rest, said seat part comprising spaced apart flexible seat board and inflexible support, means to support said support on a floor, a pair of outwardly curved spring steel sheets respectively fixed to the front and rear edges of said seat board and said support, a plurality of spring units mounted on said support and each composed of a rod of spring metal bent to form two coils and having upwardly extending leaf arms, cross rods integrally formed with the upper ends of said leaf arms, resilient tubes covering said cross rods, means to retain said leaf arms in predetermined positions and with tension in said coil springs, one of said cross rods being normally adapted to act as a support of said seat board, another of said cross rods being normally spaced from said seat board and the other of said cross rods being normally spaced a greater distance from said seat board than said last mentioned cross rod, whereby when the weight of an occupant of said seat is sufficiently heavy said seat board is caused to contact all of said cross rods, and when the weight of the occupant of said seat is sufficiently light said seat board remains normally spaced from two of said cross rods, means to connect said back rest to said seat part.

3. A seat comprising a back rest and a seat part comprising a spaced apart flexible seat board and inflexible support, a pair of outwardly curved spring steel sheets respectively fixed to the front and rear edges of said seat board and said support, a plurality of spring units mounted on said support and each composed of a rod of spring metal bent to form two coils and having upwardly extending leaf arms, cross rods integrally formed with the ends of said leaf arms, means to retain said leaf arms in predetermined positions and with tension in said coil springs, one of said cross rods being normally adapted to act as a support of said seat board, another of said cross rods being normally spaced from said seat board and the other of said cross rods being normally spaced a greater distance from said seat board than said last mentioned cross rod, whereby when the weight of an occupant of said seat is sufficiently heavy said seat board is caused to contact all of said cross rods, and when the weight of the occupant of said seat is sufficiently light said seat board remains normally spaced from two of said cross rods, said back rest being connected with said seat board, said spring sheets adapted to restrict the movements of said back rest to upward, downward, forward and rearward movement.

4. A seat part comprising a seat board spaced vertically from a support, a pair of curved spring sheets supporting said board with respect to said support, resilient means positioned below said board and means to retain said resilient means in a predetermined position and normally spaced from said board and in tension and so positioned that said board is caused to contact said resilient means when the weight of the occupant of said seat is sufficiently heavy.

GEORGE E. SMITH.